Oct. 15, 1929.  F. L. FELLERS  1,731,529
COMBINED TRACTION WHEEL AND POWER TAKE-OFF DEVICE FOR MOTOR VEHICLES
Filed Jan. 16, 1928  2 Sheets-Sheet 2
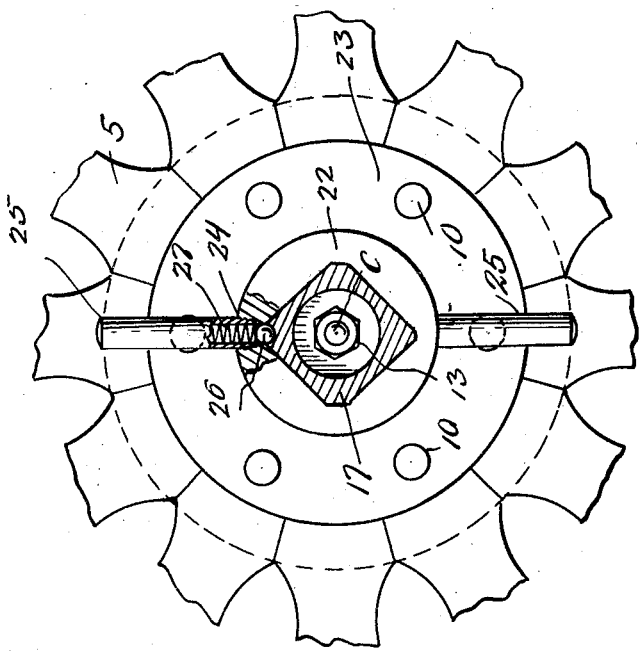
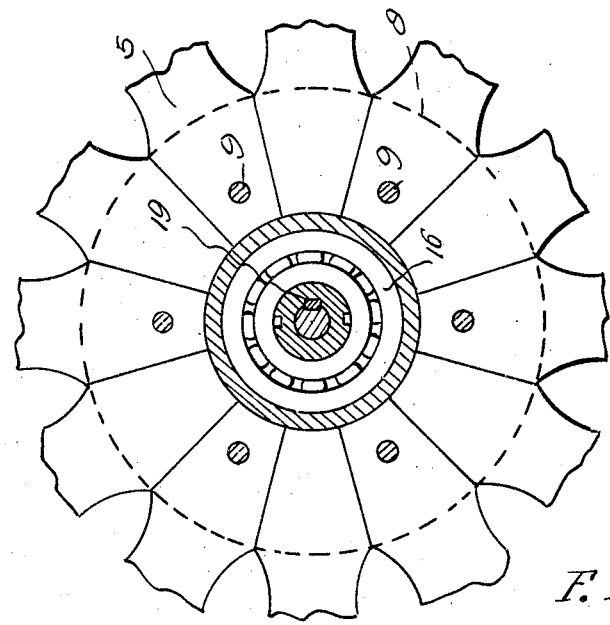
Inventor
F. L. Fellers,
By Clarence A. O'Brien
Attorney Patented Oct. 15, 1929

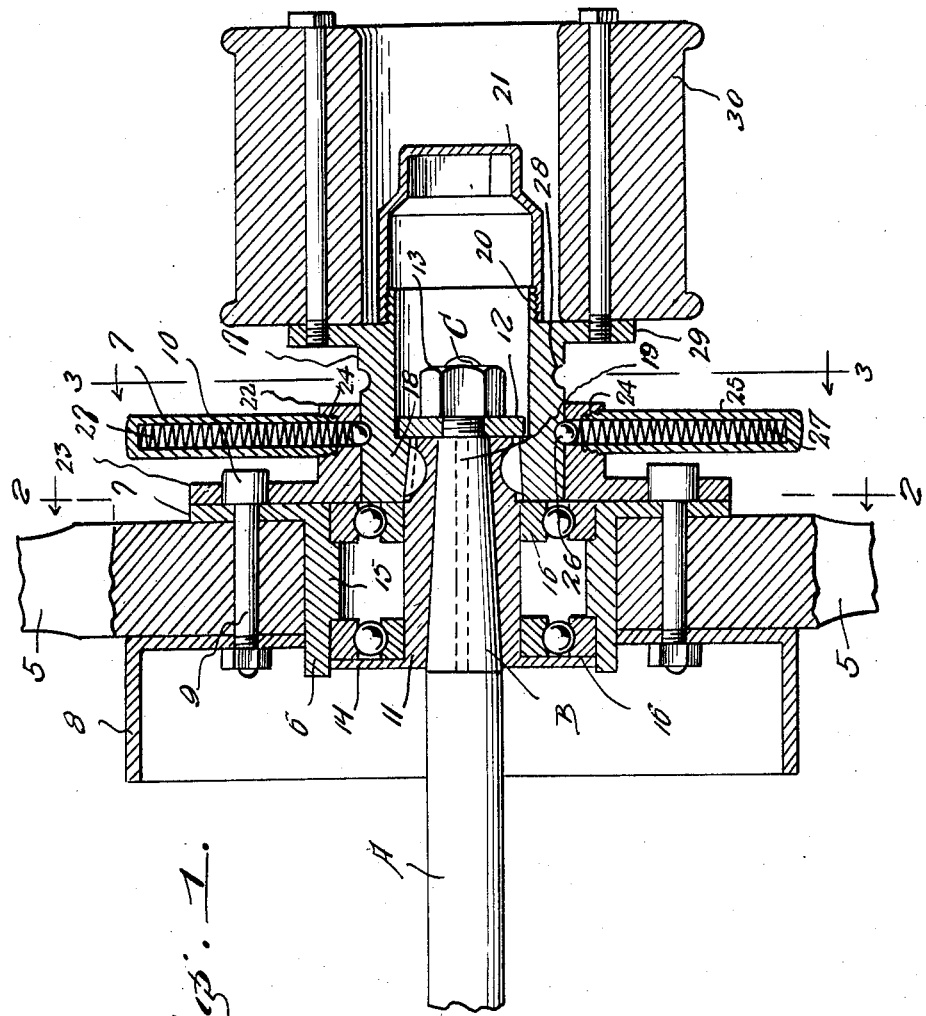

1,731,529

UNITED STATES PATENT OFFICE

FRANK L. FELLERS, OF SEBASTOPOL, CALIFORNIA

COMBINED TRACTION WHEEL AND POWER-TAKE-OFF DEVICE FOR MOTOR VEHICLES

Application filed January 16, 1928. Serial No. 247,240.

This invention relates to new and useful improvements in traction wheels for vehicles and aims to provide a combined traction wheel and power take off device, the primary object of the invention residing in such a structure including generally a wheel unit and a pulley unit combined for disposition upon the end of a vehicle power axle, and wherein the entire unit may be keyed to the axle so as to cause the rotation of the wheel during the rotation of the axle or to release the wheel unit so that the axle will turn within the hub of the wheel and at the same time impart rotation to the pulley unit with the obvious result that power may be taken from the power axle without requiring the jacking of the machine nor the application to the wheel of levers, pulleys, drums or the like.

A further object resides in the provision of such an assembly that is relatively simple in construction and inexpensive of manufacture, and that may be applied to vehicle power axles in lieu of one of the usual traction wheels thereof.

With the foregoing and other objects in view as the nature of the invention will be better understood, the same comprises the novel form, combination and arrangement of parts hereinafter more fully described, shown in the accompanying drawings and claimed.

In the accompanying drawings wherein like reference characters indicate corresponding parts throughout the several views:

Figure 1 is a fragmentary horizontal section through my improved unit disclosed as being disposed upon one end of a vehicle power axle, and Figures 2 and 3 are detail vertical sections taken substantially upon the lines 2—2 and 3—3 of Figure 1 and looking in the direction of the arrows.

Now having particular reference to the drawings, A designates fragmentarily the power axle of a vehicle wheel at the end of which is a tapered portion B, while at the end thereof is a threaded pin C. The invention per se consists of a wheel assembly including the usual radiating spokes 5, the inner ends of which are connected in suitable manner to a drum 6, the outer end of the drum being formed with a relatively wide flange 7 having close engagement with the outer surfaces of the spokes 5, while arranged against the inner surfaces of the spokes and surrounding the drum 6 is the usual brake drum 8. This brake drum 8 is connected to the wheel spokes and to the flange 7 of the hub drum 6 through the medium of bolts 9, the forward ends of which are provided with relatively large circular heads 10.

Arranged concentrically with the drum 6 is a hub collar or sleeve 11, the interior of which is tapered and that is adapted for tight engagement upon the tapered end B of the vehicle power axle A, after which a washer 12 and nut 13 is arranged upon the threaded pin C of said axle A, see Figure 1.

The inner end of the hub sleeve or collar 11 is formed with a relatively wide flange 14, while the interior of the wheel drum 6 is formed with a wide rib 15. Arranged between the drum 6 and hub collar or sleeve 11 within the channels formed at the opposite sides of the rib 15 are suitable roller bearings 16—16.

The outer end of the hub collar or sleeve 11 extends beyond the drum 6 and is of formation as disclosed in Figure 1. Arranged over this tapered end of the collar or sleeve 11 at its inner end is a collar 17 formed interiorly with a shoulder 18 that is abutted by the pin engaging washer 12. This collar 17 is keyed to the wheel unit, collar or sleeve 11 in any suitable manner while the said wheel collar or sleeve 11 is keyed to the tapered end of the axle A by an elongated key 19, see Figure 2.

At the outer end of the collar 17 the same is formed with a threaded extension 20 upon which is threaded a conventional hub cap 21 so that access may be had to the pin nut 13 and washer 12.

The outer surface of the collar 17 is preferably square shaped as disclosed in Figure 3, and slidable thereon is a collar 22 formed at its inner end with a relatively wide flange 23 having spaced openings therein for receiving the heads 10 of the previously mentioned bolts 9 when said collar 22 is forced inwardly against the flange 7 of the wheel unit drum 6 for obviously keying this drum 6 to the power axle A. However, when this said collar 22 is slid outwardly upon the collar 17 the flange 23 will become disengaged from the heads of the bolts whereupon the axle A may be rotated without imparting rotation to the drum 6 and consequently the spokes of the wheel 5, which spokes are, as is obvious, equipped with the usual rim and tire.

At opposed points the collar 22 is formed with openings 24 within which are threaded the inner open ends of somewhat elongated and narrow cylinders 25 that provide a pair of opposed handles to facilitate the longitudinal sliding of the collar 22 upon the collar 17. Arranged within the openings of said collar 22 are balls 26, while arranged within each cylinder 25 is an expansible coil spring 27 for the purpose of maintaining the balls in engagement with the collar 17. At opposed points and directly beneath the openings in the sliding collar 22 the surface of the collar 17 is formed adjacent its inner and outer ends with notches 28 within which the spring pressed balls will engage for maintaining the collar 22 into or out of locked engagement with the said spoke bolts 9.

The outer end of the collar 17 is formed with a laterally extending flange 29 having threaded openings to facilitate the bolting of a belt or cable pulley 30 thereto, which pulley has a large opening within its center to permit the hub cap 21 to project therein as disclosed. Obviously it is not necessary that the wheel unit consist of spokes 5 as the unit may be made up in simulation of the well known disc wheels or other types of wheels now in use. Furthermore, minor changes may be made in the invention without affecting the spirit and scope of the appended claims.

Having thus described the invention, what I claim as new and desire to secure by Letters Patent is:—

1. In a combined traction wheel and power take off device for motor vehicles, a generally conventional wheel structure including a hub collar or sleeve rotatably mounted within the center of the wheel and adapted to be keyed to the end of a vehicle power axle, an outwardly extending power take off collar keyed to the end of said hub collar or sleeve, manually controlled means whereby the hub collar or sleeve may be keyed to said wheel unit, said means consisting of a collar slidably keyed to the second mentioned collar, a flange formed at the inner end of said last mentioned collar and having openings therein, and bolts arranged through the wheel unit having heads at their outer ends for engagement through the holes in the flange when said last mentioned collar is forced inwardly toward the wheel unit.

2. In a combined traction wheel and power take off device for motor vehicles, a conventional wheel structure including a sleeve rotatably mounted within the hub portion of the wheel and adapted to be keyed on the end of a vehicle power axle, a collar having its inner end portion keyed on the outer end of the sleeve, manually controlled means for locking the wheel structure on the car axle for rotation therewith, said means including a second collar slidably keyed on the first mentioned collar, a laterally extending flange formed on the inner end of the second collar and having openings therein, bolts arranged through the wheeled unit having heads at their outer end for engagement through the holes in the flange when the second collar is moved inwardly toward the wheel unit, said first mentioned collar being formed in its outer surface with an inner and outer series of spaced notches, and spring pressed elements carried by the second collar for engagement selectively with the inner and outer series of notches respectively to secure the second collar in either of two positions on the first collar, and a power take-off pulley secured on the outer end of the first collar.

In testimony whereof I affix my signature.

FRANK L. FELLERS.